H. B. MILLER.
DUMPING HOIST VEHICLE.
APPLICATION FILED SEPT. 30, 1919.
1,393,151.
Patented Oct. 11, 1921.
6 SHEETS—SHEET 4.
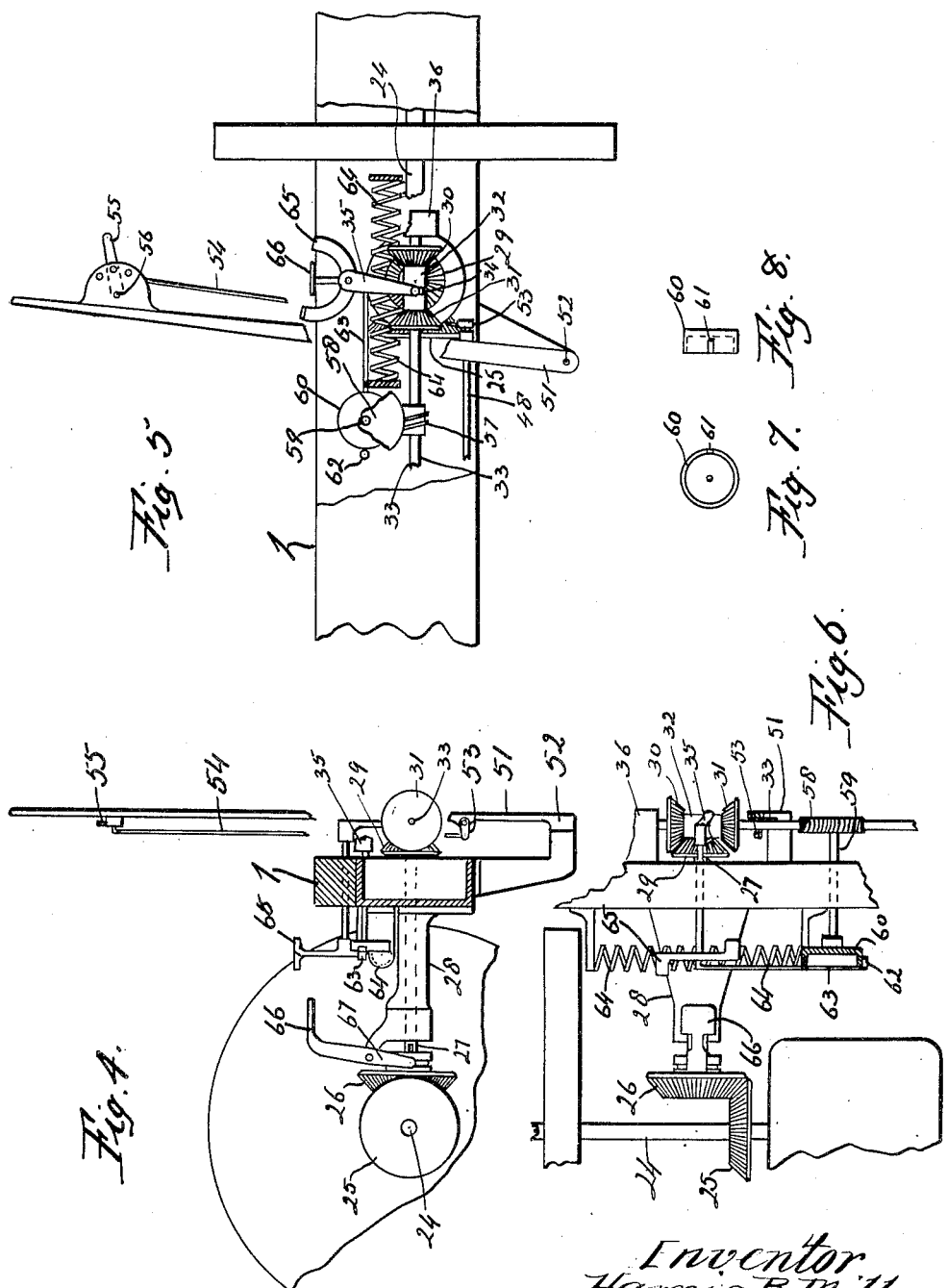

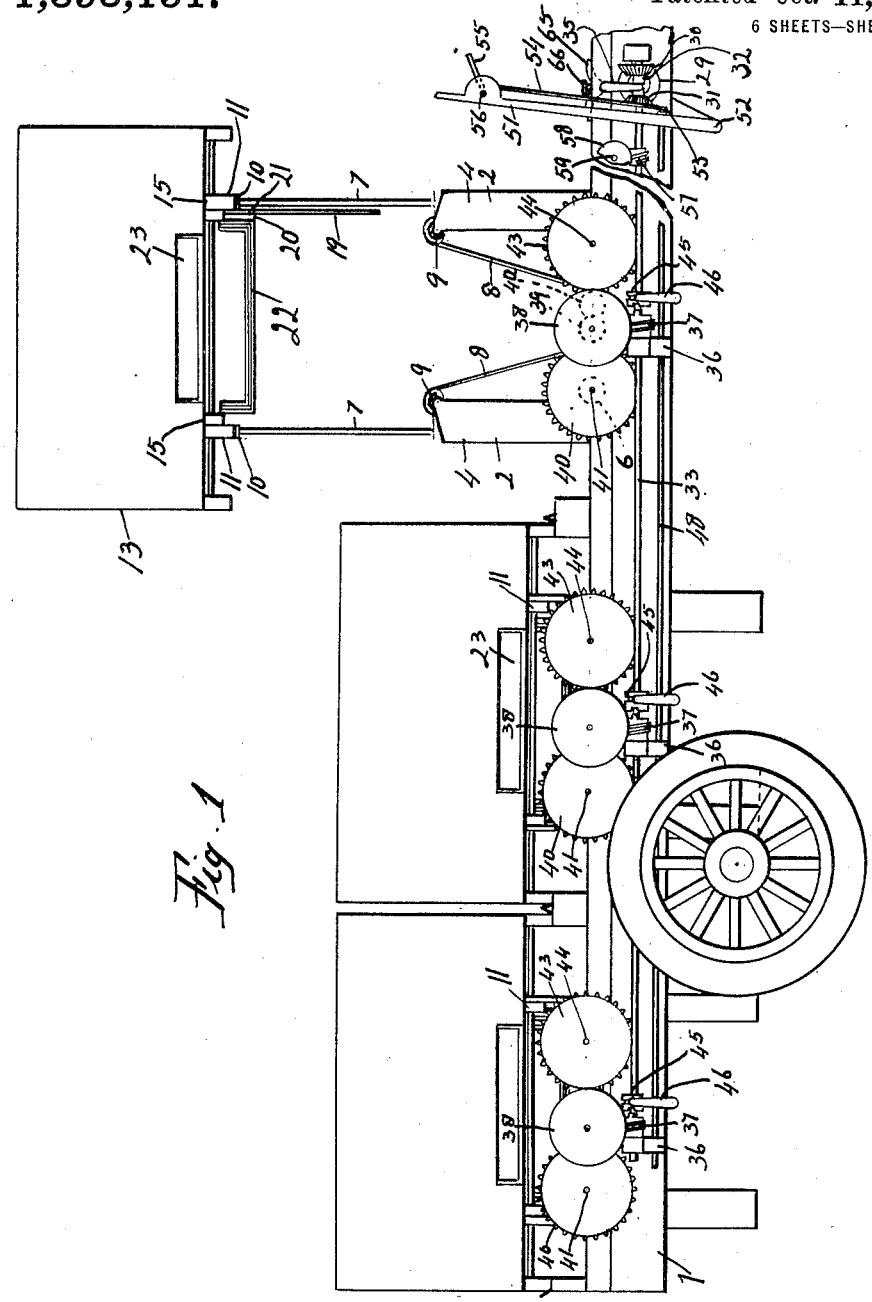

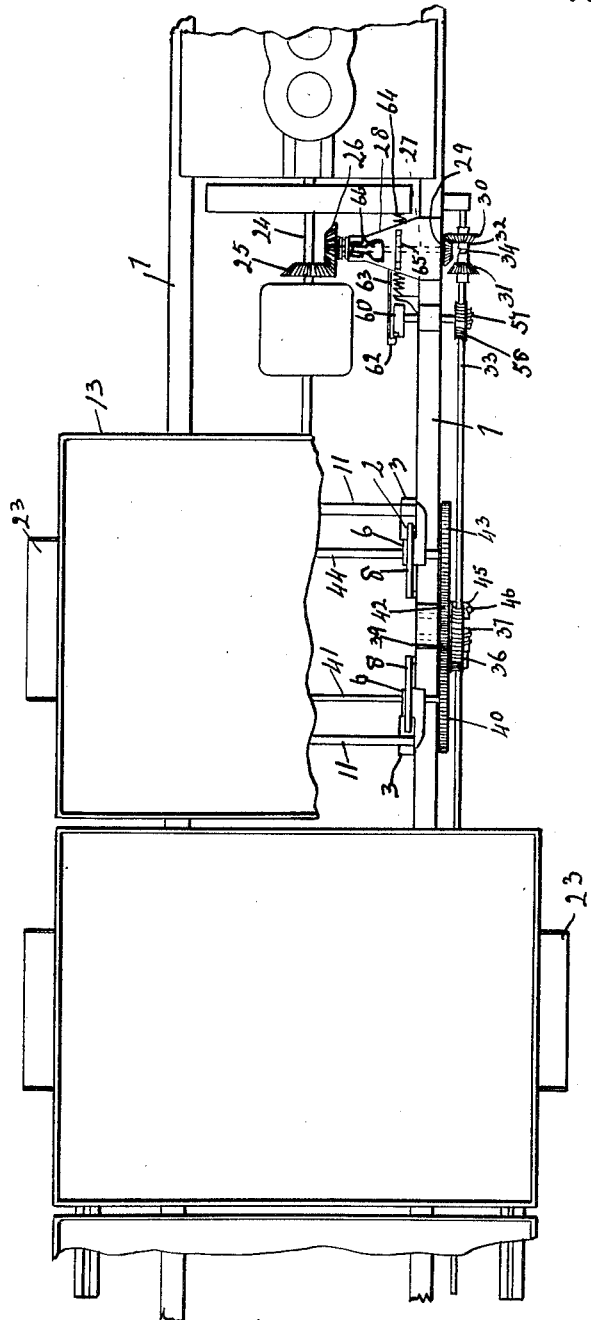

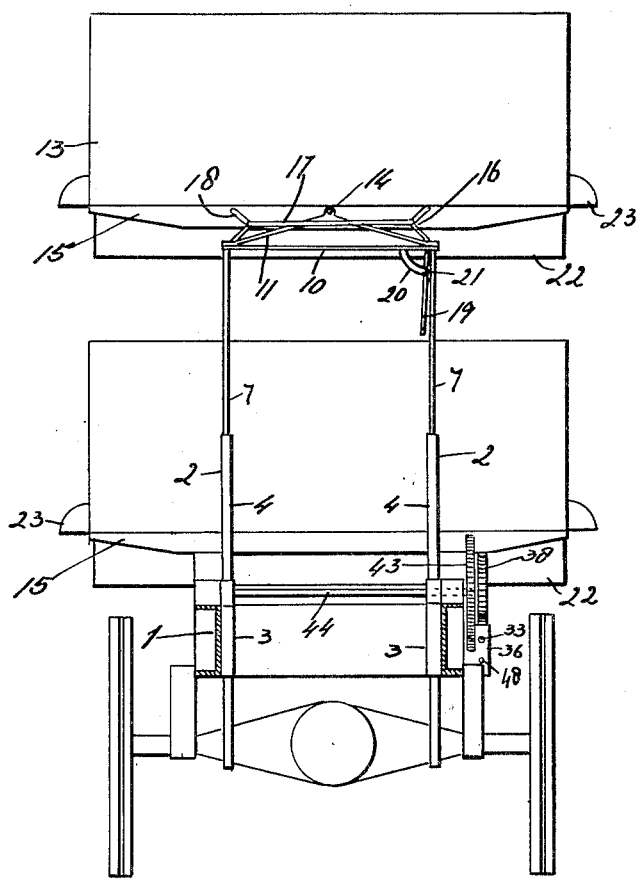

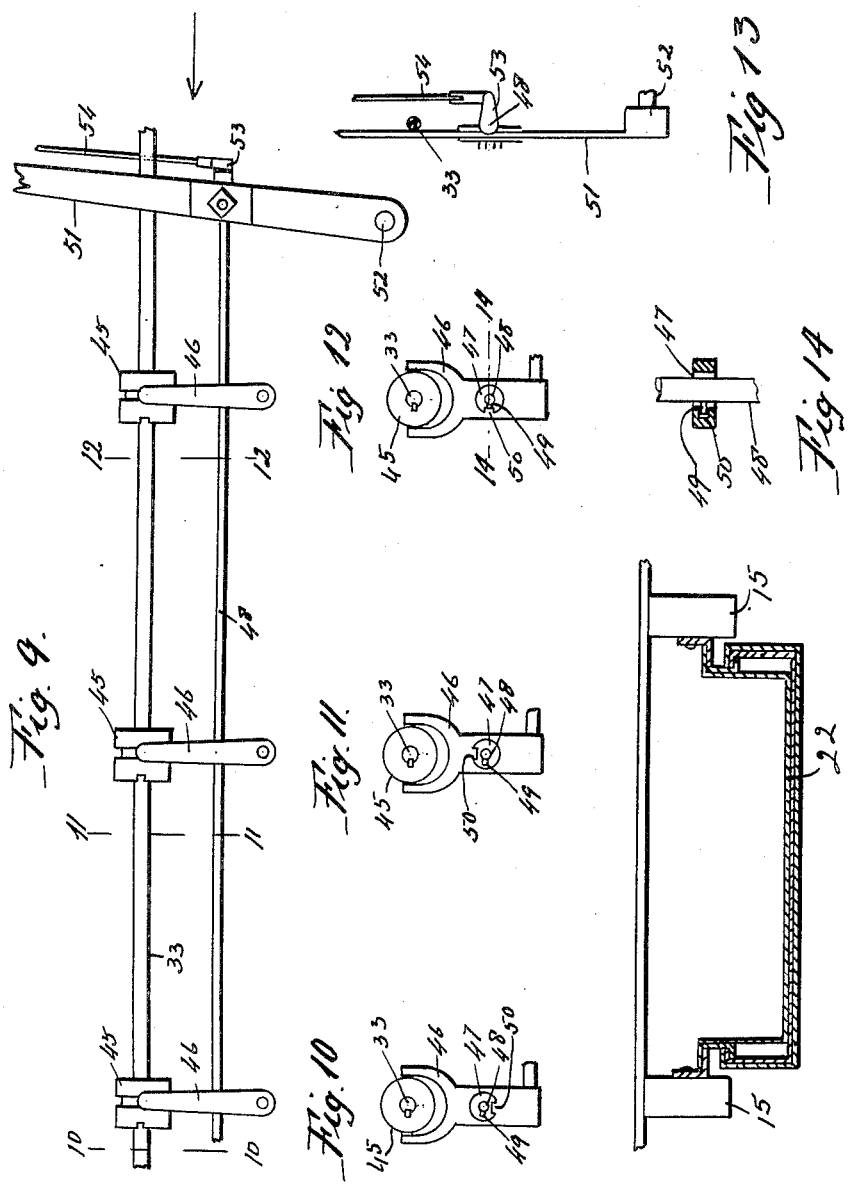

H. B. MILLER.
DUMPING HOIST VEHICLE.
APPLICATION FILED SEPT. 30, 1919.

1,393,151.

Patented Oct. 11, 1921.

Inventor
Harris B. Miller
By W. W. Williamson
Atty

UNITED STATES PATENT OFFICE.

HARRIS B. MILLER, OF PHILADELPHIA, PENNSYLVANIA.

DUMPING HOIST-VEHICLE.

1,393,151.  Specification of Letters Patent.  Patented Oct. 11, 1921.

Application filed September 30, 1919. Serial No. 327,366.

*To all whom it may concern:*

Be it known that I, HARRIS B. MILLER, a citizen of the United States, residing at Philadelphia, in the county of Philadelphia and State of Pennsylvania, have invented new and useful Improvements in Dumping Hoist-Vehicles, of which the following is a specification.

My invention relates to a new and useful improvement in vehicles, and more particularly to that class of vehicles which have a plurality of bodies mounted upon the vehicle frame or chassis in such manner that each may be hoisted independently inclined transversely to permit the dumping of the load in sections from either side of the vehicle.

A further object of my invention is to so construct a hoisting mechanism that it may be conveniently operated by the propelling power of the vehicle from the driver's seat.

A still further object of my invention is to provide for the carrying of a chute by each sectional body in such manner that said chute may be utilized for conveying the load from either side of said sectional body.

With these ends in view, this invention consists in the details of construction and combination of elements hereinafter set forth and then specifically designated by the claims.

In order that those skilled in the art to which this invention appertains, may understand how to make and use the same, I will describe its construction in detail referring by numerals to the accompanying drawings forming a part of this application, in which:—

Figure 1, is a side elevation of a portion of an automobile of the type of an automobile truck showing my present improvements applied thereto, one of the sectional bodies being shown in elevated position.

Fig. 2, is a plan view certain of the sectional bodies being partly broken away.

Fig. 3, is an end view of the vehicle a part of the frame work being in section.

Fig. 4, is an enlarged sectional elevation of the mechanism for transmitting power from the driving shaft of the countershaft for operating the hoisting mechanism and showing the treadles for throwing this mechanism in and out of action.

Fig. 5, is a side elevation of Fig. 4, partly broken away and sectioned to show the position of the various parts.

Fig. 6, is a plan view of Fig. 5.

Fig. 7, is a face view of the cam for locking the transmission mechanism in its adjustments.

Fig. 8, is an edge view of Fig. 7.

Fig. 9, is an enlarged elevation of the clutch mechanism for putting into or out of operation the hoisting mechanisms of the sectional bodies.

Fig. 10, is a section at the line 10—10 of Fig. 9.

Fig. 11, is a section at the line 11—11 of Fig. 9.

Fig. 12, is a section at the line 12—12 of Fig. 9.

Fig. 13, is an end view of Fig. 9 looking in the direction of the arrow.

Fig. 14, is a section at the line 14—14 of Fig. 12.

Fig. 18, is a detail section of the cross beams in which are formed guideways in the chute.

Figure 15:
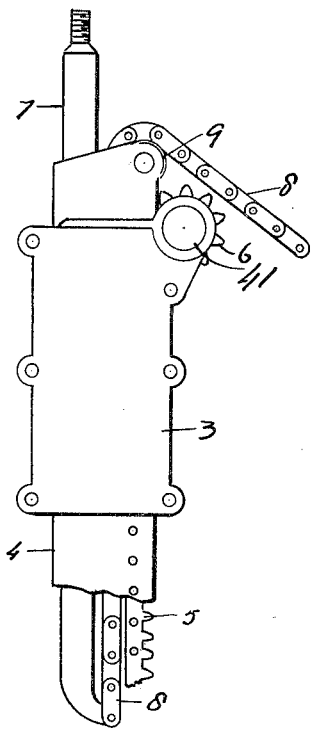
Fig. 15, is an enlarged elevation of the body lifting mechanism.
Figure 16:
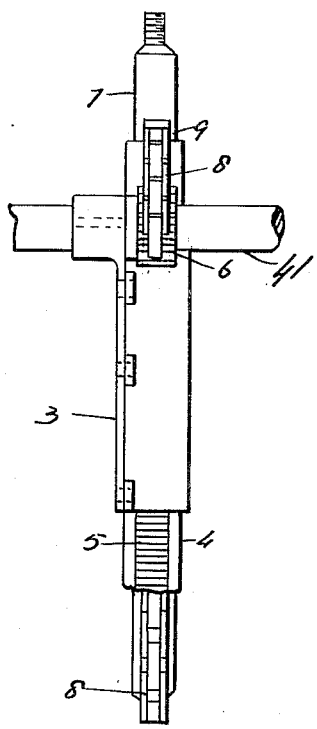
Fig. 16, is an edge view of Fig. 15.
Figure 17:
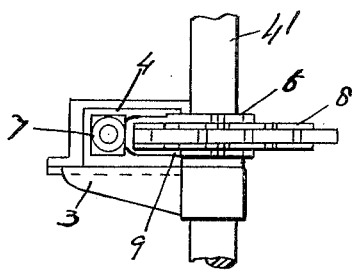
Fig. 17, is a plan view of Fig. 15.

In carrying out my invention as here embodied, 1 represents the frame of the vehicle such as a chassis of an automobile truck and upon this frame are secured and supported body lifting mechanisms 2 which are arranged in sets each set comprising four members; it being understood that as many sets of these lifting mechanisms are utilized as there are sectional bodies with the vehicle, in the vehicle here shown there being three such bodies.

Each of the unit body lifting mechanisms consists of a casing 3 through which slides the hollow post 4, said post having a rack bar 5 secured therein which latter is adapted to mesh with the pinion 6 journaled in suitable bearings upon the casing 3.

7 represents a standard which is fitted to slide in the hollow post 4 and has attached to its lower end the chain 8 which passes upward through the hollow post and over the guideway pulley or roll 9 journaled in suitable bearings carried at the upper end of the hollow post. The outer end of the chain 9 is secured to the chassis of the vehicle so that when the pinion 6 is revolved in the direction to lift the hollow post the standard 7 will not only be carried upward with said post at the same ratio, but will be caused to travel at an increased rate of speed by reason of that portion of the chain lying within the hollow post being drawn upward as the post is forced upward thus raising the standard at approximately double the speed at which the post is elevated and therefore twice the height.

The upper ends of each set of four standards are connected together by cross bars 10 and upon the frame work thus formed is supported the bridge 11 to which one of the sectional bodies 13 is pivoted as indicated at 14, the cross beams 15 being secured to the underside of the sectional body for conveniently accomplishing the pivoting of the body.

A pair of toggle levers 16 are pivoted to the cross beams and to the frame 10 and are connected by a reach rod 17 to a similar pair of toggle levers 18 also pivoted to the cross beams and frames. A lever 19 is connected with the toggle levers 16 and swings over a segment 20 to which it may be locked by a convenient latch 21 in this central position by which arrangement the body may be tilted upon the pivot 14 either to one side or the other by the manipulation of the hand lever 19 through the action of the toggle levers 16 and 18 as will be readily understood.

22 represents a sectional chute fitted between the cross beams 15 so as to be stored beneath the body or be drawn outward therefrom from either side to receive the contents of said body from either of the spouts 23 and convey said contents to the point of delivery.

24 represents the drive shaft of the truck and on this shaft is secured a beveled gear 25 which meshes with a corresponding beveled gear 26 the latter being splined upon the shaft 27 so as to have a limited sliding movement thereon, but rotating therewith.

The shaft 27 is journaled in a suitable bearing 28 and upon its outer end is secured the beveled gear 29 which is adapted to mesh with one or the other of the beveled gears 30 or 31. These gears 30 and 31 are secured upon a barrel 32 which is splined upon the shaft 33 the barrel having a groove 34 therein for the engagement of the fork lever 35 by which means one or the other of these beveled gears may be put into mesh with the beveled gear 29 for the purpose hereinafter described.

The shaft 33 is journaled in the bearings 36 carried by the chassis and extends the entire length of the truck and upon this shaft are journaled the worms 37 here shown as three in number, but one for each hoisting mechanism.

Each of the worms 37 meshes with a worm wheel 38 which carries a pinion 39, said pinion meshing with the gear wheel 40 which latter is secured upon the shaft 41 extending across the chassis and carrying two of the pinions 6 which mesh with the rack bars 5 on each side of the machine.

The pinion 39 also meshes with an idle pinion 42 which latter meshes with the gear wheel 43 secured upon the shaft 44 extending crosswise of the chassis in carrying two of the pinions 6 which mesh with the opposite rack bars 5. Thus when this train of gears is revolved from the worm 37 the rack bars will be elevated or lowered as the case may be, raising or lowering one of the sectional bodies as before described.

In order that the particular body may be raised or lowered independent of the remaining bodies a clutch 45 is splined upon the shaft 33 adjacent to each of the worms 37 and adapted to engage with said worms so as to transmit motion thereto from the shaft 33 and each of these clutches is provided with a pivoted forked lever 46 for moving the clutch into and out of engagement with this particular worm, and in each of these levers is formed an opening 47 through which passes the selecting rod 48 which rod has a pin 49 in each of the clutch levers each of said pins being adapted to pass between the pair of lugs 50 formed upon each of the clutch levers and these pairs of lugs are so located relative to these pins that the revolving of the selecting rod 48 will bring one of said pins between the lugs of one of the clutch levers while the remaining pins are out of alinement with the lugs of the remaining clutch levers. Thus a longitudinal movement of the selecting rod will operate only the clutch lever with which this pin is in engagement with its lugs the other clutch levers remaining unaffected.

51 represents the operating lever which is pivoted at 52 and has connected thereto the selecting rod 48 so that the latter may be revolved on its axis and moved back and forth by this operating lever as the case requires and upon the inner end of the selecting rod is secured a crank 53 which is connected by the rod 54 to the hand lever 55 pivoted at 56 to the operating lever. By manipulating the hand lever 55 the selecting rod 48 will be rotated upon its axis thus putting one of the pins 49 into engagement with the lugs 50 upon one of the clutch levers 46 so that when the operating lever is thereafter moved the desired clutch 45 will be engaged with its worm permitting power to be transmitted from the shaft 33 to the hoisting mechanism of the particular sectional body to be raised or lowered.

The hand lever 55 may be provided with any suitable means for locking it in any one of the desired adjustments for pulling any one of the hoisting mechanisms.

In order that the hoisting mechanisms may not be accidentally jammed, I provide a timing mechanism which consists of a worm 57 secured upon the shaft 33 which meshes with the worm wheel 58 secured upon the short shaft 59 the opposite end of said shaft carrying a flanged timing disk 60. Through the flange of this timing disk is formed a slot 61 for the passage of the pin 62 the latter being carried by the rod 63, said rod being connected to the forked lever 35 so as to control said lever as next explained.

The forked lever 35 has a spring 64 bearing upon each side thereof so as to tend to hold it in its central position, and this central position is assumed by the forked lever when the pin 62 is lying within the slot 61; but when the forked lever 35 is swung rearward to put the beveled gear 30 into mesh with the beveled gear 29 the pin 62 will be moved out of the slot and thereafter bear upon the outer periphery of the timing disk 60 and thus hold said beveled gears in mesh. The revolving of the timing disk 60 during the operation of the hoisting mechanism will ultimately again bring the slot 61 into alinement with the pin 62 and the springs 64 will then enter said pin within said slot and at the same time disengage the beveled gears arresting the hoisting operation.

The swinging of the forked lever 35 in the opposite direction from that just described will put the beveled gear 31 into mesh with the beveled gear 29 and will draw the pin 62 inside the side of the flanged timing disk where it will likewise be retained until the slot 61 comes into alinement therewith after a complete revolution of said disk, also shutting off the lowering operation.

When the gear 30 is in mesh with the gear 29 a previously selected hoisting mechanism will be caused to elevate its sectional body when the gear 31 is in mesh with the gear 29 and the sectional body will be lowered.

For convenience a double treadle 65 is connected with the forked lever 35 so that the driver without leaving his seat upon the truck may put either of the beveled gears 30 or 31 into mesh with the beveled gear 29.

In order that the entire hoisting mechanism may be disconnected from the drive shaft 24 of the truck a treadle 66 carried by the forked lever 67 is adapted to throw the gear 26 out of mesh with the beveled gear 25 thus entirely disconnecting the mechanism and leaving the truck free for traction purposes.

From the foregoing description the operation of my improvements will obviously be as follows:—

The vehicle being driven to the point where it is desired to unload one of the sectional bodies thereof it is only necessary for the driver to disconnect the drive shaft 24 from the traction mechanism in the usual manner leaving said shaft in operation from the motor when by setting the hand lever 55 to the point at the adjustment corresponding to the sectional body to be elevated and drawing upon the operating lever 51 to put the clutch 45 corresponding to said sectional body into engagement with its worm. Now by operating the treadle 65 so as to put the gear 30 into mesh with the gear 29 and then throwing the gear 26 into mesh with the gear 25 by the depression of the treadle 66 the selected sectional body will be elevated and when reaching its upward limit will be stopped by the action of the timing mechanism as before described. When this has been accomplished the sectional body is inclined to one side or the other by the operation of the lever 19 and the chute drawn out beneath one of the spouts 23 when the contents of said body may be conveyed to the point desired.

The lowering of the body takes place by the reversed action of the mechanisms. Thus it will be seen that a multiple load may be conveyed by the vehicle and sections thereof delivered without interfering with the other sections and this is especially advantageous in the delivery of coal since several customers may be served one after the other without the return of the vehicle to the source of supply.

Instead of using the beveled gears 25 and 26 smooth face beveled disks may be substituted therefore and power transmitted from the shaft 24 to the shaft 27 by the friction between these two disks.

Of course I do not wish to be limited to the exact details of construction as herein shown as these may be varied within the limits of the appended claims without departing from the spirit of my invention.

Having thus fully described my invention, what I claim as new and useful is:—

1. In a vehicle of the character described, a drive shaft, means for revolving said drive shaft in either direction from the power plant of the vehicle, a timing disk, means for revolving said disk from the drive shaft, and means acting in conjunction with the timing disk for shutting off power between the drive shaft and the power plant.

2. In a vehicle of the character described, a drive shaft, means for transmitting power from the power plant of the vehicle to said drive shaft, a series of clutches splined upon the drive shaft, levers for operating said clutches, a selecting rod passing through openings within each of the levers, a pin carried by the selecting rod for each of the levers, a pair of lugs carried by each of the levers, with which the pins may be caused to engage, means for revolving the selecting rod so as to bring one of the pins in engagement with the lugs of the desired lever, and means for sliding the selecting rod lengthwise for operating the particular lever selected.

In testimony whereof, I have hereunto affixed my signature.

HARRIS B. MILLER.